Sept. 4, 1951  R. S. HUYCK  2,566,614
HYDRAULIC BRAKE

Filed May 2, 1938  3 Sheets-Sheet 1

INVENTOR.
RALPH S. HUYCK
BY Jerome R. Cox
ATTORNEY.

Sept. 4, 1951 R. S. HUYCK 2,566,614
HYDRAULIC BRAKE

Filed May 2, 1938 3 Sheets-Sheet 2

INVENTOR,
RALPH S. HUYCK
BY Jerome R. Cox.
ATTORNEY.

Sept. 4, 1951  R. S. HUYCK  2,566,614
HYDRAULIC BRAKE
Filed May 2, 1938  3 Sheets-Sheet 3
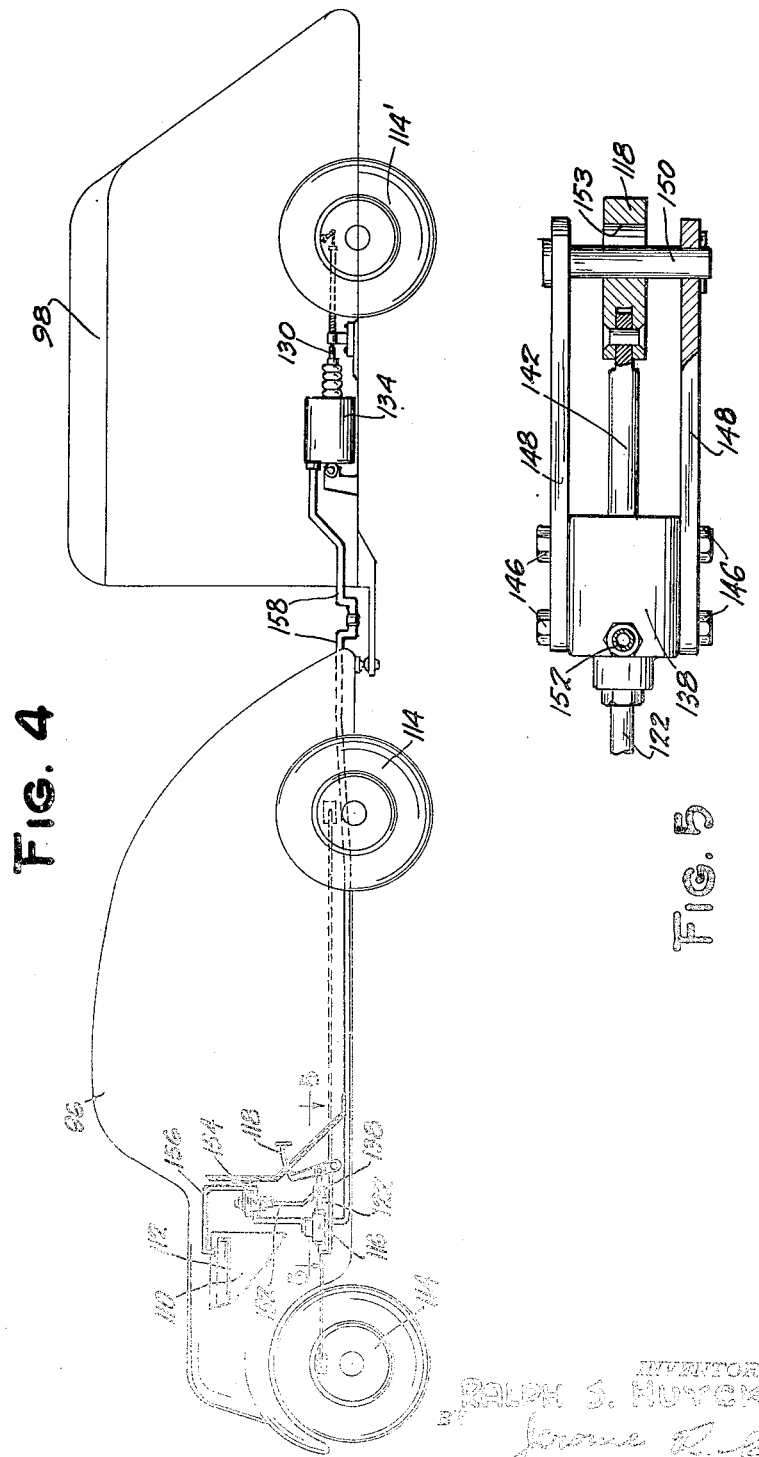

Patented Sept. 4, 1951

2,566,614

UNITED STATES PATENT OFFICE 2,566,614

HYDRAULIC BRAKE

Ralph S. Huyck, South Bend, Ind., assignor to Bendix Products Corporation, South Bend, Ind., a corporation of Indiana Application May 2, 1938, Serial No. 205,448

8 Claims. (Cl. 188—3)

This invention relates to brakes and more particularly to power brakes.

An object of the invention is to provide novel means for actuating and controlling power brakes.

Another object is to provide such means adapted to provide a reaction on the brake pedal proportional to the force exerted by the power means.

Another object is to provide such a means in which the brake pedal movement is proportional to the movement of the braking elements.

Still another object is to provide a system of controlling power brakes which may be conveniently installed in a conventional brake system.

And yet another object is to utilize such a system for operating power brakes on a trailer.

Still another object is to provide a system for operating trailer brakes in which the degree of braking of the trailer is proportional to the degree of braking of the automobile towing the trailer, and a desirable feature of the invention in this regard is that the system may be installed in a conventional automobile without substantial modification of the braking system of the automobile.

I prefer to accomplish these objects by interposing a small hydraulic cylinder between the brake pedal and the brake actuating means and by providing a power brake control valve which is actuated by the pressure created in this cylinder.

As an important feature of the invention, the control valve is provided with a pressure responsive element resisting valve actuation in accordance with the pressure being transmitted by the valve to the power means, and consequently reacting through the hydraulic fluid upon the brake pedal in proportion to the power exerted.

Other objects and desirable particular constructions of parts will be apparent upon reference to the following detailed description of two illustrative embodiments of my invention shown in the accompanying drawings, in which:

Figure 4 is a diagrammatic view of my novel system adapted for operating the brakes of a trailer; and Figure 5 is a partial section on the line 5—5 of Figure 4.

Figure 1:
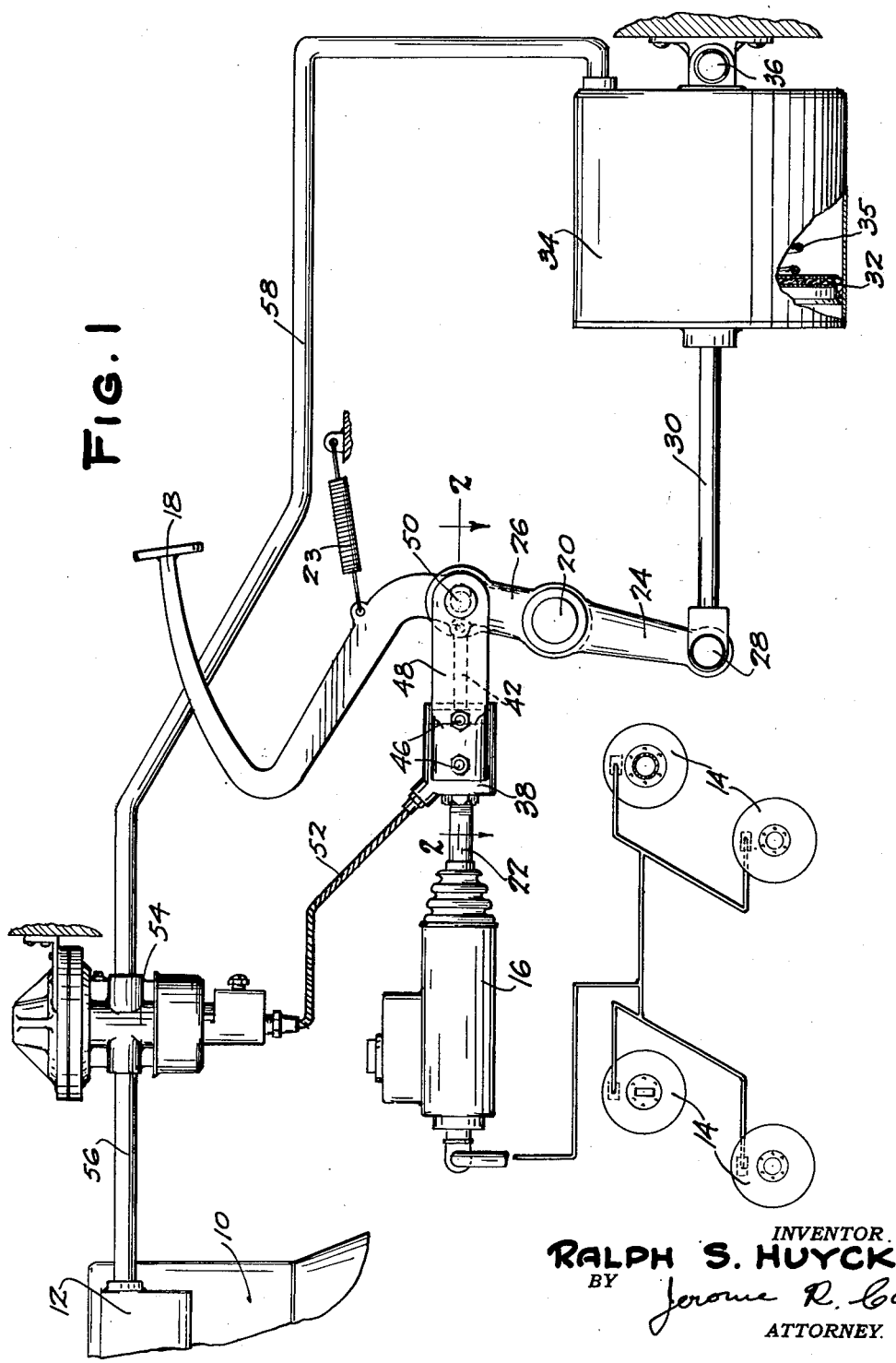
Figure 1 is a diagrammatic view of my novel braking system adapted for operating the brakes of an automobile.

Referring now to Figure 1, parts of an automobile are shown comprising an internal combustion engine 10 having an intake manifold 12 providing a source of vacuum, brakes 14 adapted to be operated in the usual manner by fluid pressure from a conventional master cylinder 16, and a brake pedal 18, pivoted at 20 adjacent the operating end of the master cylinder 16 from which the usual piston rod 22 projects. The pedal is provided with the usual return spring 23.

I prefer to provide a power lever 24 pivoted coaxially with the brake pedal and having furcations 26 extending on each side of the brake pedal. The lower end of the lever may be connected at 28 to a piston rod 30 and piston 32 of a differential air pressure power device in the form of vacuum power cylinder 34, the one shown being of the air-suspended type. The cylinder is connected to the vehicle chassis by a fixed pivot 36. The power cylinder 34 contains the usual return spring 35 adapted to return the piston to the position shown in the figure.

To the end of the master cylinder piston rod 22 is adjustably secured by means of threads and a lock-nut an auxiliary master cylinder or fluid pressure creating device 38 having a piston 40 adapted to be operated by a piston rod 42 pivotally connected to the brake pedal by a pin 44.

Figure 2:
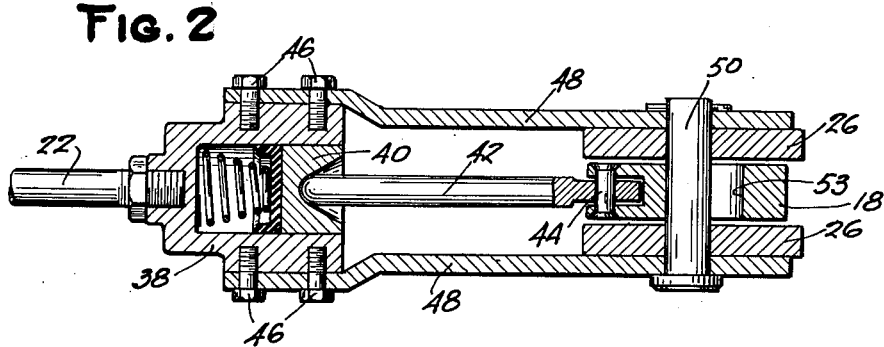
Figure 2 is an enlarged section on the line 2—2 of Figure 1.

The auxiliary master cylinder has secured on its sides by means of screws 46 or the like, a pair of arms 48 extending outside of the furcations 26 of the power lever 24 and pivoted thereto by means of a pin 50 which also passes through an elongated slot 53 formed in the brake pedal 18 to provide a lost motion device (see Figure 2).

A fluid conduit 52 extends from the auxiliary fluid pressure device to a hydraulically actuated vacuum control valve 54 fixedly secured to some part of the vehicle chassis such as the usual fire wall.

A vacuum conduit 56 connects the valve 54 to the intake manifold 12 and a controlled pressure conduit 58 connects the valve 54 to the power cylinder 34.

Figure 3:
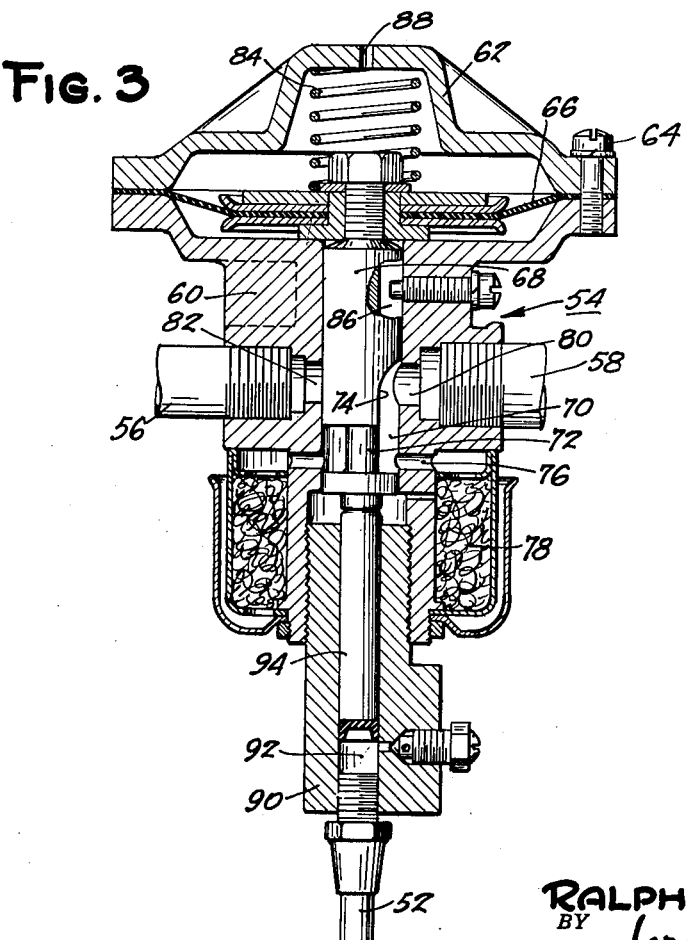
Figure 3 is a longitudinal section through the hydraulically actuated control valve.

Referring now to Figure 3 in which the valve 54 is shown in detail, it will be seen to comprise a body casting 60 and a cap 62 secured together by screws 64 to clamp between them a flexible diaphragm or pressure responsive element 66.

A valve plunger 68 is secured to the center of the diaphragm and is slidable in a longitudinal bore 70 formed in the body casting 60. The plunger 68 is formed with a reduced diameter portion 72 and a cutaway portion 74 arranged so that in the extreme downward position of the plunger shown in Figure 3, an annular series of air ports 76, formed in the body casting 60 and communicating with the atmosphere through an air cleaner 78, are brought into communication with a controlled pressure port 80 connected to the conduit 58 and a vacuum port 82 connected to the vacuum conduit 56 is cut off; in the extreme upward position of the plunger, the air ports 76 are cut off and the ports 80 and 82 are brought into communication; and in an intermediate position, which is known as the "lapped" position, both the air and vacuum ports are cut off.

A spring 84 holds the plunger in the normal released position shown in Figure 3.

A longitudinal slot 86, formed in the plunger 68, admits the pressure in the port 80 to the lower side of the diaphragm 66 and a port 88 in the cap 62 admits atmospheric pressure to the upper side of the diaphragm 66.

Threaded into the end of the valve body 60 opposite the diaphragm is a hydraulic actuating cylinder 90 having a pressure chamber 92 connected to the conduit 52 and a piston or plunger 94 engageable with the valve plunger 68 to move it upwardly.

I prefer to make the effective area of the piston 94 substantially less than the area of the piston 40 whereby movement of the pedal 18 is materially multiplied at the valve. Similarly, the reaction pressure of the diaphragm will be multiplied on the piston 40 whereby a much smaller diaphragm may be used to provide a substantial reaction. Such a smaller diaphragm would be much more durable and cheaper and easier to manufacture than a larger one.

In operation, when the pedal 18 is depressed, fluid pressure is created in the auxiliary master cylinder 38 as a result of the movement permitted by the lost motion slot 53.

This pressure is transmitted to the pressure chamber 92 of the hydraulic valve actuating cylinder 90 forcing the piston 94 and the valve plunger 68 upwardly.

The movement of the valve plunger first closes the air ports 76 and then opens the vacuum port 82 to admit vacuum to the port 80, the controlled pressure conduit 58, and the rearward end of the power cylinder 34. Air, entering the forward end of the cylinder 34 through suitable openings (not shown), forces the piston 32 and piston rod 30 to the right, thereby swinging the power lever 24 in a counterclockwise direction. The counterclockwise movement of the power lever, transmitted through the arms 48 and the auxiliary hydraulic cylinder 38 forces the piston rod 22 of the master cylinder 16 into the cylinder to apply the brakes 14 in the usual manner.

It will be noted that, since the auxiliary cylinder 38 is carried to the left by this operation, the pedal must be continuously depressed in order to maintain a valve operating pressure and continue the brake actuation. This effects the desired "follow-up."

The vacuum admitted to the power cylinder 34 also acts on the lower side of the diaphragm 66 through the slot 86 and tends to force the valve plunger downwardly. This creates a corresponding fluid pressure in the operating cylinder chamber 92 which is transmitted through the conduit 52 to the auxiliary power cylinder 38 where it acts on the piston 40, the piston rod 42 and the pedal 18 tending to force them back to their initial position.

Thus it will be observed that, whenever the brakes 14 are applied by my novel system, a pressure proportional to the braking force must be exerted on the pedal 18.

Whenever the desired braking force is reached, the depression of the pedal 18 is terminated, whereupon the power lever overruns the pedal an amount sufficient to withdraw the piston 40 slightly from the auxiliary cylinder 38 and thereby permit the control valve 54 to move back to the "lapped" position. In this position, with neither air nor vacuum being admitted to the port 80 of the valve, a condition of equilibrium is maintained as long as the pedal is held in its position.

Now, is the pedal 18 is released and permitted to return toward its normal position under the influence of its return spring 23, the piston 40 is withdrawn further from the auxiliary cylinder 38, thereby permitting the plunger 68 of the control valve 54 to return to its initial position under the influence of the spring 84. This again admits air to the conduit 58 and the power cylinder 34 permitting the return spring 35 of the power cylinder to return the piston to its initial position and release the brakes.

In the event the power system fails, depression of the pedal 18 will take up the lost motion provided by the slot 53, whereupon the pedal will engage the pin 50 and apply the brakes directly in the usual manner.

In the modified system for operating trailer brakes shown in Figures 4 and 5, similar parts are designated by the same reference numerals as in Figures 1 to 3 increased by 100.

In these figures, an automobile having brakes 114 is shown connected to a trailer having brakes 114'. The trailer brakes are connected to be operated in any suitable manner by the power cylinder 134 mounted on the trailer and connected with the conduit 158.

The mechanism on the automobile is similar to that of the previously described embodiment except that the power lever and cylinder are omitted.

In the normal operation of this system, the force applied to the pedal 118 is transmitted by the auxiliary cylinder piston through the fluid in the auxiliary cylinder 138 to the casing of the cylinder 138 and the master cylinder piston rod 122 to operate the master cylinder 116 and apply the brakes 114 of the automobile 96.

At the same time the fluid in the auxiliary cylinder 138 acts on the control valve 154 to admit vacuum to the power cylinder 134 and apply the trailer brakes 114'.

If for some reason the vacuum system should fail and permit the pedal to move so that all of the lost motion provided by the slot 153 is taken up, at least the automobile brakes 114 will be operative by direct engagement of the pedal 118 with the pin 150

In this embodiment, the actuator 134 for the trailer brakes does not have any mechanical connection with the brake pedal, as is the case in the first embodiment. However, the valve 154 acts to control the degree of vacuum in the cylinder 134 in accordance with the pressure on the pedal 118, since the pedal pressure and the vacuum acting on the trailer brake actuator are in effect balanced on opposite sides of the diaphragm 66.

Since the vacuum pressure exerted in the power cylinder 134 is proportional to the pressure in the hydraulic cylinder 138 and the force exerted on the master cylinder 116 is proportional to this pressure, it will be seen that my simple and novel system provides accurate proportioning at all times between the automobile braking and the trailer braking. This proportion

I claim:

1. In a brake system, means for operating brakes comprising a pair of parallel arms, a power lever and a pedal on coaxial pivots, a pin pivoting said lever and said arms and passing through an elongated slot formed in the pedal, a power cylinder connected to the power lever, a fluid pressure creating device secured to said arms and having an actuating element connected to the pedal, and a control valve for the power cylinder having a piston actuated by the pressure in the pressure creating device.

2. In a brake system, means for operating brakes comprising a pair of parallel arms, a power lever and a pedal on coaxial pivots, a pin pivoting said lever and said arms and passing through an elongated slot formed in the pedal, a vacuum power cylinder connected to the power lever, a fluid pressure creating device secured to said arms and having an actuating element connected to the pedal, and a control valve for the power cylinder having a piston actuated by the pressure in the pressure creating device, and also provided with a diaphragm subjected to the vacuum transmitted to the power cylinder and acting in opposition to the piston.

3. A braking system for an automobile and trailer comprising brakes for each, a pedal on the automobile, means for actuating the automobile brakes including a master cylinder, means connecting the pedal with said actuating means having interposed therein a fluid pressure creating device, a differential air pressure power cylinder for actuating the trailer brakes, and a control valve for the power cylinder actuated by the pressure in the pressure creating means.

4. A braking system for an automobile and trailer comprising brakes for each, a pedal on the automobile, means for actuating the automobile brakes including a master cylinder, means connecting the pedal with said actuating means having interposed therein a hydraulic cylinder connected to one and a piston in the cylinder connected to the other, a differential air pressure power cylinder for actuating the trailer brakes, and a control valve for the power cylinder having an actuating piston actuated by the pressure in the hydraulic cylinder.

5. A braking system for an automobile and trailer comprising brakes for each, a pedal on the automobile, means for actuating the automobile brakes including a master cylinder, means connecting the pedal with said actuating means having interposed therein a hydraulic cylinder connected to one and a piston in the cylinder conected to the other, a differential air pressure power cylinder for actuating the trailer brakes, and a control valve for the power cylinder having an actuating piston actuated by the pressure in the hydraulic cylinder, the actuating piston of the control valve being substantially smaller than the piston of the connecting means.

6. A braking system for an automobile and trailer comprising brakes for each, a pedal on the automobile, means for actuating the automobile brakes, means connecting the pedal with said actuating means having interposed therein a hydraulic cylinder connected to one and a piston in the cylinder connected to the other, a differential air pressure power cylinder for actuating the trailer brakes, and a control valve for the power cylinder having an actuating piston actuated by the pressure in the hydraulic cylinder, said connecting means also having lost motion elements between the pedal and the brake operating means operable if the relative movement between the cylinder and piston becomes excessive.

7. A braking system for an automobile and trailer comprising brakes for each, a pedal on the automobile, means for actuating the automobile brakes including a master cylinder, means connecting the pedal with said actuating means having interposed therein a hydraulic cylinder connected to one and a piston in the cylinder connected to the other, a differential air pressure power cylinder for actuating the trailer brakes, and a control valve for the power cylinder having an actuating piston actuated by the pressure in the hydraulic cylinder, the control valve having a pressure responsive element subjected to the pressure transmitted to the power cylinder and balanced against the force of the actuating piston.

8. In a braking system, hydraulic brake operating means including a master cylinder, a brake pedal, means connecting the pedal and the master cylinder so as to operate the master cylinder irrespective of the application of power, including a hydraulic pressure delivering device, a power device connected to said connecting means to act on said master cylinder, and means for controlling the power device having an element responsive to the pressure in the pressure delivering means and effecting the operation of the controlling means, said controlling means being constructed and arranged to react on the brake pedal, by an unyielding fluid between them, in proportion to the effective power of the power device.

RALPH S. HUYCK.

REFERENCES CITED

The following references are of record in the file of this patent:

UNITED STATES PATENTS

| Number | Name | Date |
|---|---|---|
| 1,903,973 | Boughton | Apr. 18, 1933 |
| 1,912,261 | Defives | May 30, 1933 |
| 2,032,185 | Sciaky | Feb. 25, 1936 |
| 2,115,438 | Wolf | Apr. 26, 1938 |
| 2,191,318 | Hoyt | Feb. 20, 1940 |
| 2,211,043 | Arbuckle | Aug. 13, 1940 |
| 2,212,918 | Hukill | Aug. 27, 1940 |
| 2,215,602 | Baade | Sept. 24, 1940 |
| 2,219,689 | Kuiper | Oct. 29, 1940 |
| 2,252,482 | Gates | Aug. 12, 1941 |
| 2,260,492 | Stelzer | Oct. 28, 1941 |
| 2,306,346 | Rockwell | Dec. 22, 1942 |

FOREIGN PATENTS

| Number | Country | Date |
|---|---|---|
| 403,668 | Great Britain | Dec. 27, 1933 |
| 425,651 | Great Britain | Mar. 19, 1935 |